Patented Jan. 10, 1933

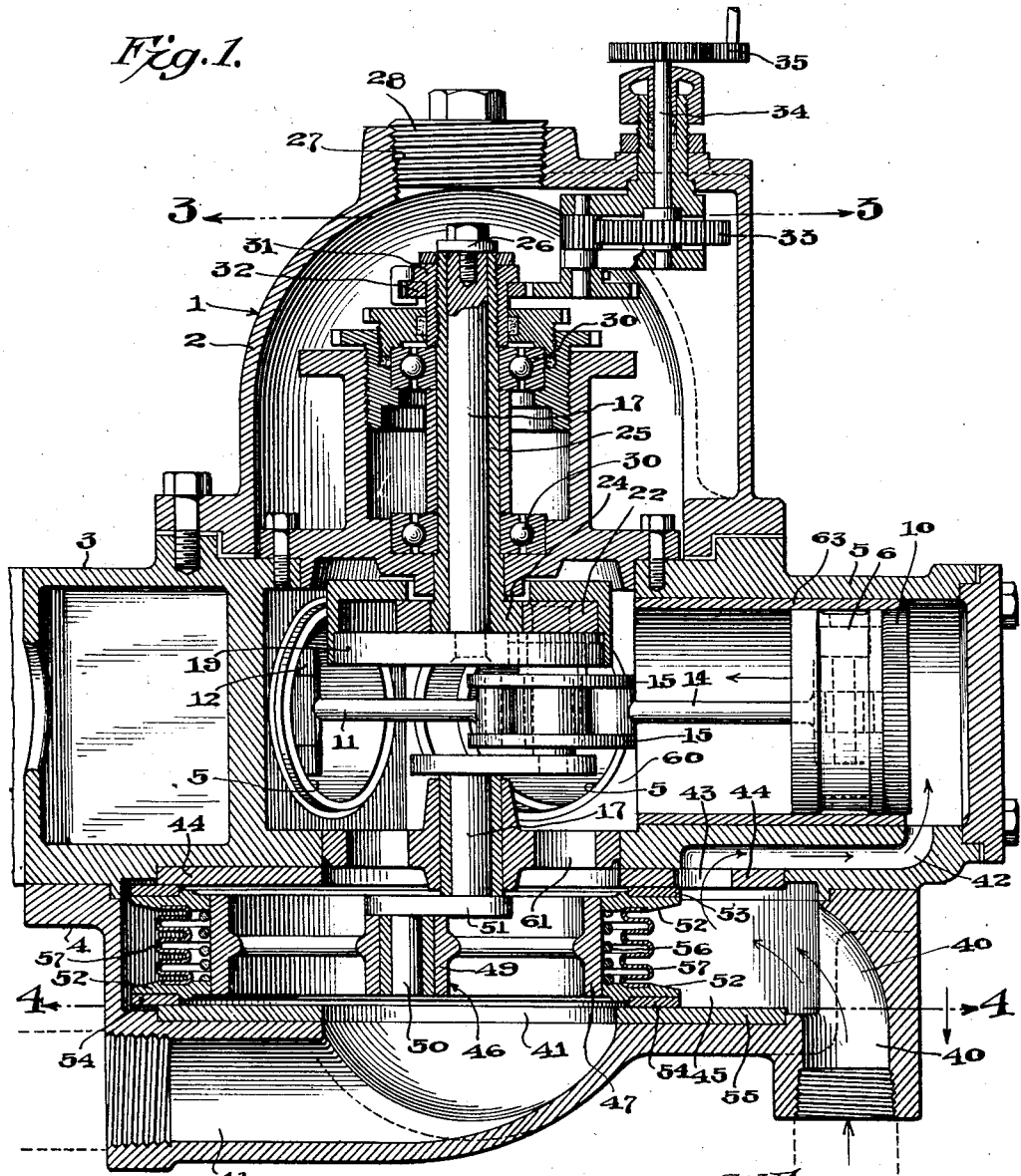

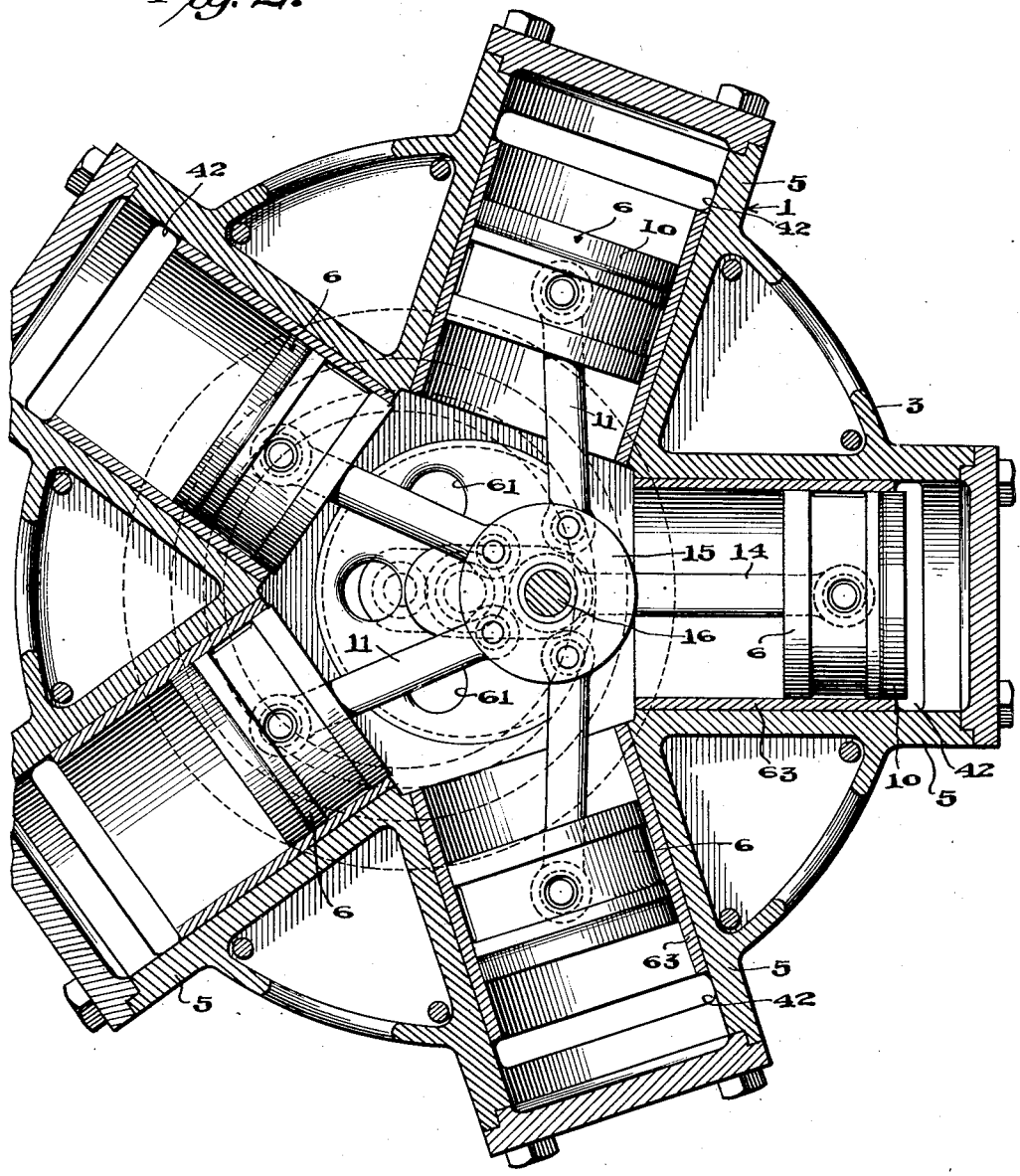

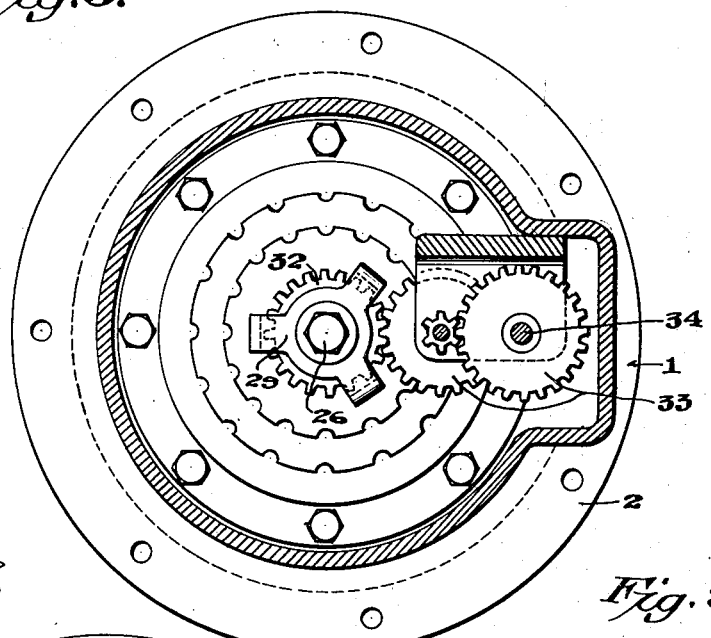
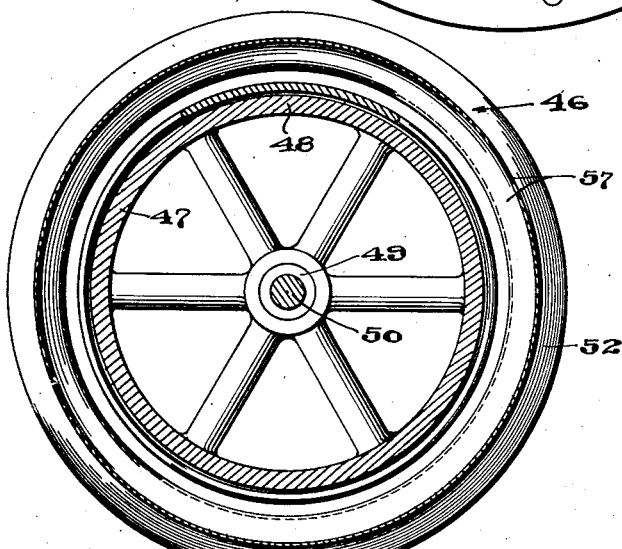
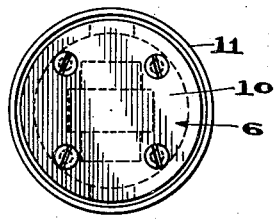
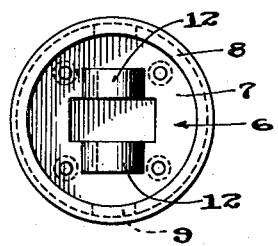
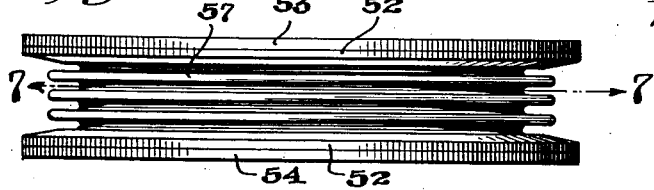

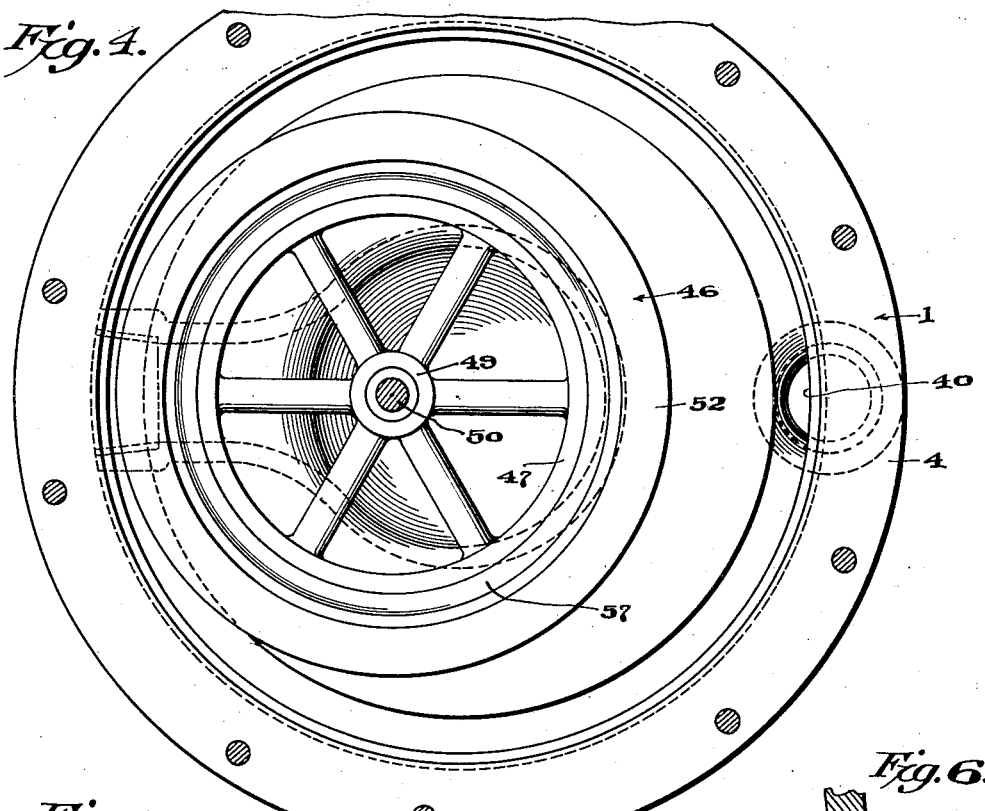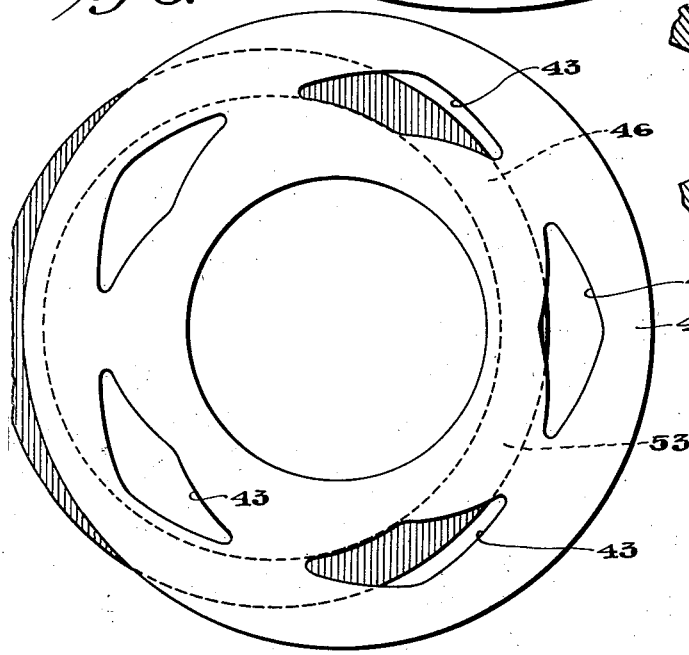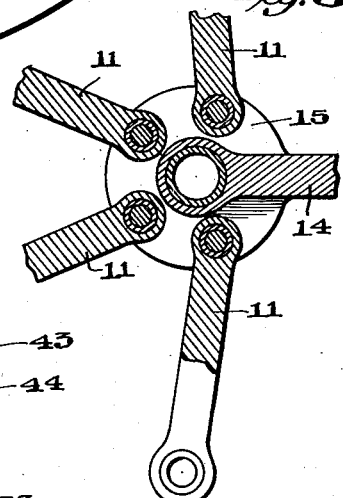

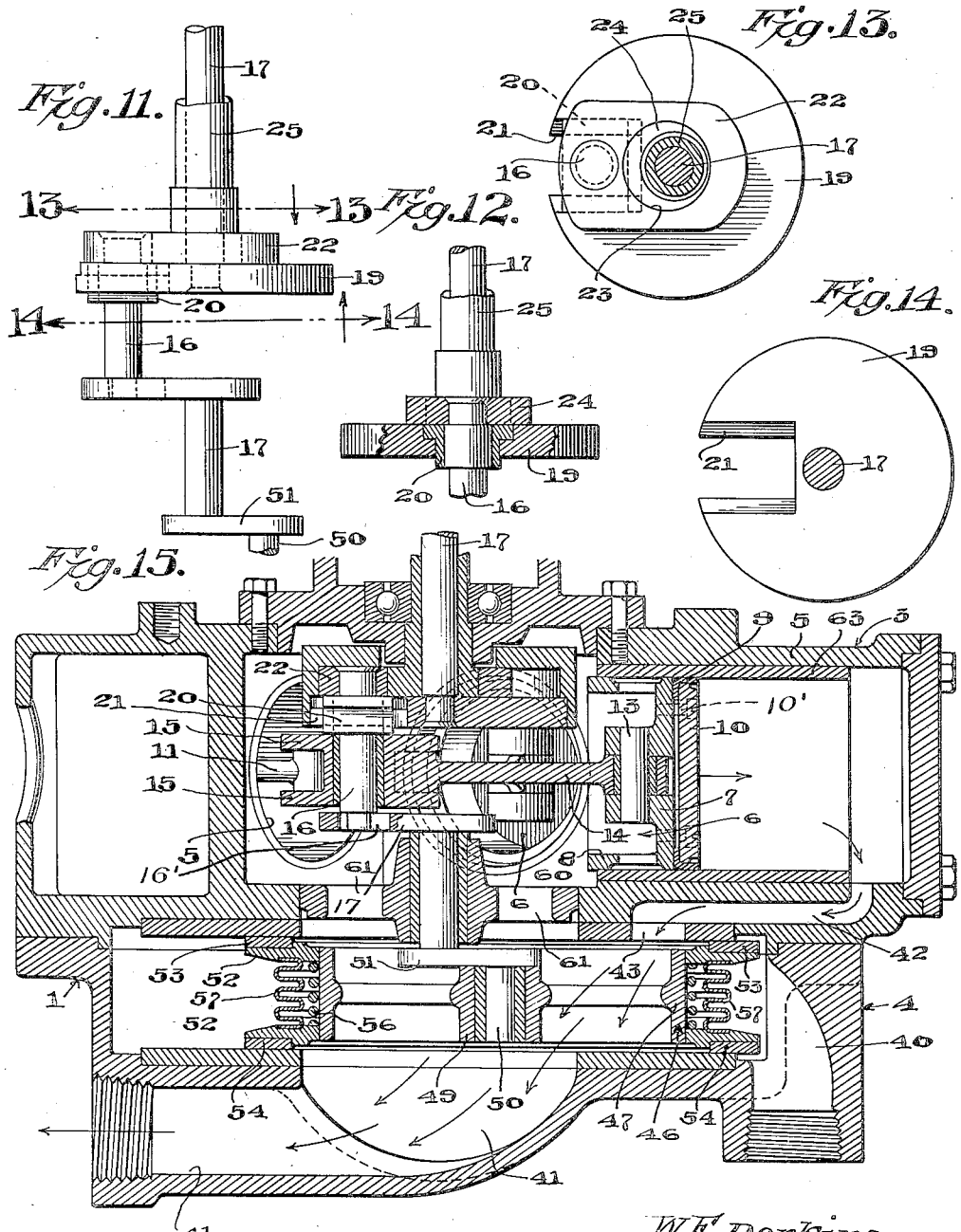

1,893,595

UNITED STATES PATENT OFFICE

WALTER F. PERKINS, OF MONTCLAIR, AND LEON TRAGER, OF NEWARK, NEW JERSEY, ASSIGNORS TO WORTHINGTON PUMP AND MACHINERY CORPORATION, OF NEW YORK, N. Y., A CORPORATION OF VIRGINIA

METER

Application filed April 4, 1930. Serial No. 441,597.

This invention relates to liquid measuring meters and an object of the invention is to provide a meter of the positive displacement type, which will prevent leakage, inaccuracies in measuring, etc., and one which at all times will be positive and constant in its operation and measuring.

More specifically the present invention comprises a meter of the displacement piston type, whereby predetermined quantities of liquid regulated by cylinder bore and piston stroke are displaced or measured upon each complete stroke or movement of each piston of the meter assembly and as these elements are inflexible, the amount of liquid displaced or measured upon each complete stroke of each piston will be constant, resulting in accurate measuring.

Another object of the invention is to provide in a meter structure as specified a plurality, preferably an odd number of pistons, no two of which are in line, so that should one piston of the unit become air or gas bound during its idle stroke, it will not cushion, retard or interfere with the stroke of any other piston in the unit and consequently will not reduce its movement or affect the measuring operation of the meter; and also to connect the various piston rods of the pistons concentrically about the axis of the master rod or coupling, which is in turn connected to the crankpin of the crankshaft of the meter in such manner that all of the pistons will operate in proper timing and may be mounted in the same plane about the axis of the meter.

A further object of the present invention is to provide means, readily accessible from the exterior of the meter for adjusting the timing of operation of the pistons in their timed relationship to each other and as to the scope of their movement.

With these and other objects in view, as may appear from the accompanying specification, the invention consists of various features of construction and combination of parts, which will be first described in connection with the accompanying drawings, showing a meter of the preferred form embodying the invention, and the features forming the invention will be specifically pointed out in the claims.

In the drawings:

Fig. 1 is a vertical section through the improved meter.

Fig. 2 is a horizontal section through the meter.

Fig. 3 is a horizontal section through the meter taken on the line 3—3 of Fig. 1.

Fig. 4 is a horizontal section through the meter taken on the line 4—4 of Fig. 1.

Fig. 5 is a detailed plan of the valve port member.

Fig. 6 is a detailed section illustrating the manner of connecting the various piston rods to the crankshaft of the meter.

Fig. 7 is a horizontal section through the movable valve element taken on the line 7—7 of Fig. 8.

Fig. 8 is a side elevation of the movable valve element.

Fig. 9 is an end view showing the outer end of one of the pistons.

Fig. 10 is an end view showing the inner end of one of the pistons.

Fig. 11 is a fragmentary side elevation of the crankshaft.

Fig. 12 is a fragmentary view of the crankshaft partly in section and taken at right angles to Fig. 11.

Fig. 13 is a detailed horizontal section through the crankshaft taken on the line 13—13 of Fig. 11.

Fig. 14 is a horizontal section through the crankshaft taken on the line 14—14 of Fig. 11, and Fig. 15 is a fragmentary vertical section through the meter showing the various parts disposed in fluid discharging position in contra-distinction to the intake position of the elements as shown in Fig. 1.

Referring more particularly to the drawings, the improved meter comprises a casing 1 which is formed in substantially three sections, namely, the upper or what we will call—the indicating section 2, the intermediate cylinder section 3 and the lower liquid intake and discharge section 4 and these sections may be connected in any suitable manner.

The intermediate section 3 has a plurality of cylinders 5 formed therein and radiating from the axis of the casing. The cylinders 5 are disposed in such radial manner that no two of them are in direct line, and an odd number of cylinders are preferably provided, so that counter balancing or opposed balancing of any one piston 6 by another during the operation of the meter will be prevented and thus any inaccuracy of measurement or failure of completing of movement of the pistons will be prevented in instances where one piston might become air or gas bound in its idle stroke.

The pistons 6 reciprocate within the cylinders 5, one being provided for each cylinder, and these pistons are each composed of the main body 7, having the skirt 8 formed thereon.

The piston bodies 6 have removable piston heads 10 attached thereto by means of screws 10', which are slightly smaller in diameter than the piston body 6 and have gaskets or leather cups 9 about their perimeters, which are held tightly in place by the engagement of the piston head 10 with their inturned portions as clearly shown in Fig. 15 of the drawings. The leather cups 9 prevent leakage from the intake side of the piston to the discharge side.

The piston rods 11 are connected to the pistons in any approved manner such as by the bosses 12 and pins 13. One of the pistons 6 has a master piston or connecting rod 14 connected thereto, which has relatively large circular discs 15 formed on its inner end through which the crankpin 16 of the crankshaft assembly 17 of the meter extends. The piston rods 11 of the other pistons are connected to the discs 15 on a circular line concentrically of the axis of the crankpin 16 as clearly shown in Fig. 6 of the drawings and thus as shown in Figs. 1 and 15 of the drawings. All of the pistons 6 may be mounted so that their axes are in the same plane.

The crankpin 16 is adjustably connected to the crank 19 of the crankshaft assembly by means of a slide 20, which is mounted for movement radially of the axis of the shaft 17 in the guide slot 21 formed in the crank 19. The lower end of the crankpin 16 is mounted in slot 16' in the lower crank arm 17. The slide 20 has a cam member or block 22 connected thereto, which is slidably mounted upon the crank 19 and is provided with an opening 23, disposed excentrically of the shaft 17. A cam 24 is mounted in the opening 23 and is carried by a sleeve 25, so that upon rotation of the sleeve 25 the slide 20 will be moved in its guide 21 to vary the relative positions of the axes of the shaft 17 and the crankpin 16 and consequently vary the relative timing and within small limits the strokes of the various pistons 6 of the meter for permitting accurate adjustment of these elements, should such adjustment be necessary, during the operation of the meter.

The sleeve 25 is locked for normal rotation with the shaft 17 by a suitable locking device 26, which is released when it is desired to adjust the relative positions of the axes of the shaft 17 and crankpin 16.

The upper section 2 of the housing 1 has an opening 27, and it is normally closed by a plug 28, so that access to the sleeve 25 and locking member 26 may be easily accomplished without dismantling the meter.

The sleeve 25 may have any suitable means thereon, such as the member 29 to facilitate its rotation after release of the locking member 26. Suitable bearings such as the ball bearings 30 are provided for the sleeve 25 and shaft 17. The sleeve 25 has a gear carrying collar 31, mounted thereon for rotation therewith, which carries a gear 32. The gear 32 is connected through the medium of a chain of gears 33 with the indicator operating shaft 34. The shaft 34 may be connected by gearing as indicated at 35 to an indicating mechanism of any approved form.

The fluid intake and exhaust or outlet section 4 of the casing 1 has an inlet 40 at its periphery and fluid outlet 41 disposed substantially about the axis of the casing, which, it will be noted by reference to Figs. 1 and 15 of the drawings, is at the bottom or lowermost part of the meter so as to permit fluid to drain into the outlet and prevent accumulation or pocketing of such fluid in the meter.

The intermediate casing section 3 has a plurality of ports or passageways 42, one communicating with the outer end of the interior of each of the cylinders 5 and these passages 42 have communication through the ports 43 of the valve disc 44 with the valve chamber 45 of the casing section 3.

The disc 44 is stationary and the inlet of fluid into and its outlet from the cylinders 5 through the ports 43 and passages 42 is controlled by the movable valve 46.

The valve 46 comprises a hub or carrying member 47, which is in the form of a spoked rim 48 having a hub 49 through which the crankpin 50 extends. The crankpin 50 is excentrically connected through the medium of the crank 51 with the shaft 17, so that the disc 45 will be moved in a circular path excentrically of the axis of the shaft 17 by rotation of the shaft and as indicated in dotted lines in Fig. 5 of the drawings.

The carrying member 47 of the valve 46 has flanges 52 about its perimeter at its edges and these flanges carry wear rings 53 and 54. The former of which cooperates with the ports 43 of the valve disc 44 while the latter rides over the inner surface of a wear plate 55. The flanges 52 and rings 53 and 54 are urged apart and the rings 53 and 54 in engagement respectively with the valve disc 44 and the wear plate 55 by a coil spring 56.

A bellows 57 is connected to the flanges 52 and extends from one flange to the other as clearly shown in Figs. 1, 8 and 15 for providing a yieldable fluid-tight seal about the space in the valve chamber 45 exteriorly of the perimeter of the member 46 and the space internally of the perimeter of the rim 47.

In Fig. 1 of the drawings, the various elements are illustrated as positioned for permitting the inlet of fluid, to be measured, into the meter and at such times, that is, at the beginning of the inlet stroke of the piston 6, the piston is at the outer-most limit of its stroke and the valve 46 is positioned so that the port 43 for the respective cylinder 5, the piston of which is in fluid inlet position, is open, allowing the fluid under pressure to pass through the chamber 45, port 43, passageway 42 and into the cylinder, where it, acting upon the piston, will force the piston into its inward position as shown in Fig. 15 of the drawings. During the movement of the piston under the pressure action of the fluid entering the cylinder, the crankshaft will be rotated and it will in turn move the valve 46 in a circular path excentrically of the axis of the shaft 17 and move the valve ring 53 outwardly of the port 43, cutting off the space externally of the bellows 57 from communication with the port 43 and consequently cutting off the fluid inlet 40 from communication with the cylinder 5. The ring 53 being relatively narrow, will at such time, open the port 43 to the space within the rim 48 of the valve member, and open the cylinder 5 through this space and the port 43 and passage 42 to the outlet 41 of the meter. Owing to the arrangement of the various ports 43 in the valve disc 44, another of the cylinders 5 will be opened for communication with the fluid inlet at the time the cylinder 5 shown in Figs. 1 and 15 is opened to the outlet 41 of the meter, and thus provide continuous operation of the meter, the various cylinders and pistons acting in sequence to measure the fluid passing through the meter. Since the pistons and the cylinders are inflexible the quantity of fluid entering each cylinder and forced therefrom will always be constant, resulting in extreme accuracy in the measuring of the fluid. Should it be found on test in the initial operation or at any time during prolonged operation of the meter that there is a slight discrepancy in measuring, this may be corrected by the adjustment of the relative positions of the axes of the crankpin 16 and the crankshaft 17 as heretofore described.

The drain ports or openings 61 permit fluid which might leak past the pistons to pass from the space 60 to the space within the rim 47 of the valve member 46 and consequently to the outlet 41.

The ports 43 in the valve disc 44 are of particular shape or configuration so as to insure the proper size of port or opening with the various cylinders during the operation of the meter to insure the accurate measuring. By particular reference to Fig. 5 of the drawings, it will be noted that these ports 43 are of greatest cross sections at their transverse centre and that they gradually decrease in cross sectional area towards their ends and in uniformity from their transverse centres. The walls or sides of the ports 43 are accurate and the diagonally opposed walls are curved on the same radii and also on the same radii as the valve ring 53.

If it is so desired, cylinder liners 63 may be provided for the cylinders 5.

It will be understood that the invention is not to be limited to the specific construction or arrangement of parts shown but that these may be modified widely within the invention defined by the claims.

What is claimed is:

1. In a meter, a rotary crank shaft having cranks thereon, a crank pin, means adjustably connecting said crank pin to said cranks, a plurality of cylinders disposed radially about the axis of the crank shaft and in such manner that the axes of no two cylinders are in line, pistons in said cylinders, a master connecting rod connecting one of said pistons to said crank pin, connecting rods connecting the others of said pistons to said master connecting rod, and means carried by said crank shaft for moving said crank pin to vary the relative positions of the axes of the crank pin and crank shaft.

2. In a meter, a rotatable crank shaft having a crank thereon, a crank pin connected to said crank, a plurality of cylinders disposed radially of the axis of the crank shaft and in such manner that the axes of no two cylinders are in line, pistons in said cylinders, a master connecting rod connecting one of said pistons to said crank pin, means adjustably connecting said crank pin to said crank, connecting rods connecting the other of said pistons to said master connecting rod, means carried by said crank shaft for moving said crank pin to vary the relative positions of the axes of the crank pin and crank shaft, and locking means for locking said crank pin moving means to prevent accidental movement of the crank pin relative to the crank shaft.

3. In a meter, a rotary crank shaft having cranks thereon, a crank pin, means adjustably connecting said crank pin to said cranks, a plurality of fluid displacement pistons, a master connecting rod connected to one of said pistons and to said crank pin, connecting rods connected to each of the other of said pistons and to said master connecting rod whereby all of the pistons may be mounted with their axes in the same horizontal plane, means carried by one of said cranks for moving said crank pin to vary the relative positions of the axes of the crank pin and crank shaft, and means carried by said crank shaft and cooperating with said crank-carried means for operating the latter.

4. In a meter, a rotary crank shaft having cranks thereon, a crank pin, means connecting the crank pin to said cranks to permit movement of the crank pin relative to the crank shaft, a plurality of fluid displacement pistons, connecting rods connecting said pistons to said crank pin, a sleeve rotatably mounted about a part of said crank shaft, a cam on said sleeve cooperating with said first named means for moving said crank pin laterally with relation to the axis of the crank shaft to change the relative positions of the axis of the crank shaft and crank pin.

5. In a meter, a rotary crank shaft having cranks thereon, a crank pin, means connecting the crank pin and cranks to permit movement of the crank pin relative to the shaft, a plurality of fluid displacement pistons, connecting rods connecting said pistons to said crank pin, a sleeve rotatably mounted about a part of said crank shaft, a cam on said sleeve cooperating with said first named means for moving said crank pin laterally with relation to the axis of the crank shaft upon rotation of the sleeve to change the relative positions of the axis of the crank shaft and crank pin, and means cooperating with said sleeve to lock said sleeve and cam against movement relative to the crank shaft.

6. In a meter, a rotary crank shaft having cranks thereon, a crank pin, means connecting said crank pin and cranks to permit movement of the crank pin relative to the crank shaft, a plurality of fluid displacement pistons, connecting rods connecting said pistons to said crank pin, a sleeve rotatably mounted about a part of said crank shaft, a cam on said sleeve cooperating with said first named means for moving said crank pin laterally with relation to the axis of the crank shaft upon rotation of the sleeve to change the relative positions of the axes of the crank shaft and crank pin, an indicator operating shaft, and a train of gears connecting said sleeve and indicator operating shaft.

7. In a meter, a rotary crank shaft having cranks thereon, a crank pin, means connecting said crank pin and cranks to permit movement of the crank pin relative to the crank shaft, a plurality of fluid displacement pistons, connecting rods connecting said pistons to said crank pin, a sleeve rotatably mounted about a part of said crank shaft, a cam on said sleeve cooperating with said first named means for moving said crank pin laterally with relation to the axis of the crank shaft upon rotation of the sleeve to change the relative positions of the axes of the crank shaft and crank pin, an indicator operating shaft, a train of gears connecting said sleeve and indicator operating shaft, and means cooperating with said sleeve to lock the sleeve and cam against movement relative to the crank shaft.

8. In a meter, a crankshaft, a crankpin, a plurality of cylinders disposed radially about the axis of the crankshaft and in such manner that the axes of no two cylinders are in line, pistons in said cylinders, a master connecting rod connecting one of said pistons and said crank pin, connecting rods connected to the others of said pistons and to said master connecting rod, means adjustably connecting said crankpin to the crankshaft and a cam cooperating with said means for moving said crankpin relative to the crankshaft to vary the relative positions of the axes of the crank and shaft.

9. In a meter, a crankshaft, a crankpin, a plurality of cylinders disposed radially about the axis of the crankshaft and in such manner that the axes of no two cylinders are in line, pistons in said cylinders, a master connecting rod connecting one of said pistons and said crankpin, connecting rods connected to the others of said pistons and to said master connecting rod, means adjustably connecting said crankpin to said crankshaft, a sleeve mounted about a part of said crankshaft, a cam on said sleeve cooperating with said means for moving said crankpin laterally of the axis of the crankshaft upon rotation of the sleeve to change the relative positions of the axes of the shaft and crankpin.

10. In a meter, a rotary crank shaft having cranks thereon, a crank pin, a plurality of cylinders disposed radially about the axis of the crank shaft and in such manner that the axes of no two cylinders are in line, pistons in said cylinders, a master connecting rod connecting one of said pistons and said crank pin, connecting rods connected to the others of said pistons and to said master connecting rod, means adjustably connecting said crank pin to said cranks, a cam member connected to said means, a sleeve mounted about a part of said crank shaft, a cam on said sleeve for moving said cam member to move said crank pin laterally of the axis of the crank shaft upon rotation of the sleeve to change the relative positions of the axes of the shaft and crank pin, and means cooperating with said sleeve to lock said cam and sleeve against movement relative to the shaft.

11. In a meter, a rotary crank shaft having cranks thereon, a crank pin, a plurality of cylinders disposed radially about the axis of the crank shaft and in such manner that the axes of no two cylinders are in line, pistons in said cylinders, a master connecting rod connecting one of said pistons and said crank pin, connecting rods connected to the others of said pistons and to said master connecting rod, means adjustably connecting said crank pin to the crank shaft, a cam member connected to said means, a sleeve mounted about a part of said crank shaft, a cam on said sleeve for moving said cam member to move said crank pin upon rotation of the sleeve to change the relative positions of the axes of the crank shaft and crank pin, means cooperating with said sleeve to lock said cam and sleeve against movement relative to the shaft, an indicator operating shaft, and a train of gears connecting said sleeve and indicator operating shaft.

12. In a meter, a substantially cylindrical casing, a crankshaft therein, a crankpin on said shaft, a plurality of cylinders in said casing, pistons in said cylinders, a master connecting rod connecting one of said pistons and said crankpin, connecting rods connected to the others of said pistons and to said connecting rod, said casing having a fluid intake and outlet portion having a fluid inlet opening through the perimeter of the casing and a fluid outlet opening into the casing about its axis, said casing provided with passageways and ports connecting said cylinders and said inlet and outlet portion, and a valve excentrically connected to said crankshaft and movable for controlling said ports to control flow of fluid into and out of said cylinders.

13. In a meter, a substantially cylindrical casing, a crankshaft therein, a crankpin, means adjustably connecting said crank pin to said shaft, a plurality of cylinders in said casing, pistons in said cylinders, a master connecting rod connecting one of said pistons and said crankpin, connecting rods connected to the others of said pistons and to said master connecting rod, means for moving said crankpin to vary the relative positions of the axes of the crankpin and crankshaft, said casing having a fluid inlet and outlet portion at its lower end, said inlet and outlet portion having an inlet opening through the periphery of the casing and an outlet opening about the axis of the casing, said casing provided with passageways and ports connecting said cylinders and said inlet and outlet portion, and a valve excentrically connected to said shaft for controlling said ports to control flow of fluid into and out of said cylinders.

14. In a meter, a rotary crank shaft having cranks thereon, a crank pin, means adjustably connecting said crank pin to said cranks, a plurality of cylinders disposed radially about the axis of the crank shaft and in such manner that the axes of no two cylinders are in line, pistons in said cylinders, a master connecting rod connecting one of said pistons to said crank pin, connecting rods connecting to the others of said pistons and to said master connecting rod, and means carried by said crank shaft for moving said crank pin to vary the relative positions of the axes of the crank pin and crank shaft, and a valve operated by said crank shaft for controlling inlet and outlet of fluid into and from the meter.

15. In a meter, a rotary crank shaft having cranks thereon, a crank pin, means connecting said crank pin and cranks to permit movement of the crank pin relative to the crank shaft, a plurality of fluid displacement pistons, connecting rods connecting said pistons to said crank pin, a sleeve rotatably mounted about a part of said crank shaft, a cam on said sleeve cooperating with said first named means for moving said crank pin laterally with relation to the axis of the crank shaft upon rotation of the sleeve to change the relative positions of the axes of the crank shaft and crank pin, an indicator operating shaft, a train of gears connecting said sleeve and indicator operating shaft, and a valve operated by said crank shaft for controlling inlet and outlet of fluid into and from the meter.

16. In a meter, a rotary crank shaft having cranks thereon, a crank pin, a plurality of cylinders disposed radially about the axis of the crank shaft and in such manner that the axes of no two cylinders are in line, pistons in said cylinders, a master connecting rod connecting one of said pistons and said crank pin, connecting rods connected to the others of said pistons and to said master connecting rod, means adjustably connecting said crank pin to said cranks, a cam member connected to said means, a sleeve mounted about a part of said crank shaft, and a cam on said sleeve for moving said cam member to move said crank pin laterally of the axis of the crank shaft upon rotation of the sleeve to change the relative positions of the axis of the shaft and crank pin.

17. In a meter, a rotary crank shaft having cranks thereon, a crank pin, a plurality of cylinders disposed radially about the axis of the crank shaft and in such manner that the axes of no two cylinders are in line, pistons in said cylinders, a master connecting rod connecting one of said pistons and said crank pin, connecting rods connected to the others of said pistons and to said master connecting rod, means adjustably connecting said crank pin to said cranks, a cam member connected to said means, a sleeve mounted about a part of said crank shaft, a cam on said sleeve for moving said cam member to move said crank pin laterally of the axis of the crank shaft upon rotation of the sleeve to change the relative positions of the axis of the shaft and crank pin, and a valve operated by said crank shaft for controlling the inlet and outlet of fluid into and from the meter.

In testimony whereof we affix our signatures.

WALTER F. PERKINS.
LEON TRAGER.